United States Patent [19]

Loose et al.

[11] 3,743,766

[45] July 3, 1973

[54] COLOUR TELEVISION CAMERA EQUIPMENTS

[75] Inventors: Peter William Loose, Chelmsford, Essex; Richard Arthur Sharman, West Hanningfield, Essex, both of England

[73] Assignee: The Marconi Company Limited, London, England

[22] Filed: Aug. 20, 1971

[21] Appl. No.: 173,386

[30] Foreign Application Priority Data

Aug. 29, 1970 Great Britain .................. 41,666/70

[52] U.S. Cl. .......................... 178/5.4, 178/DIG. 25

[51] Int. Cl. .......................................... H04n 5/14

[58] Field of Search ...................... 128/DIG. 25, 7.1

[56] References Cited

UNITED STATES PATENTS

| | | | |
|---|---|---|---|
| 3,562,424 | 2/1971 | Legler | 178/7.1 |
| 3,546,372 | 12/1970 | Dischert et al. | 178/DIG. 25 |
| 2,929,870 | 3/1960 | Gibson et al. | 178/DIG. 25 |
| 2,971,053 | 2/1961 | Gibson | 178/DIG. 25 |

*Primary Examiner*—Robert L. Griffin
*Assistant Examiner*—Joseph A. Orsino, Jr.
*Attorney*—Baldwin, Wight & Brown

[57] ABSTRACT

A colour television camera equipment having vertical aperture correction in which both the vertical and horizontal components of the video signal are combed. Complementary low and high pass filters are used in the vertical and horizontal combing paths respectively. Thus vertical combing is performed to provide maximum signal output at odd multiples of half the line frequency below the highest frequency useful for vertical video information, and horizontal combing is performed to provide maximum signal output at integral multiples of the line frequency above the highest frequency useful for vertical video information.

11 Claims, 8 Drawing Figures

INVENTORS
Peter William Loose
and
Richard Arthur Sharman
BY Baldwin Wight & Brown ATTORNEYS INVENTORS
Peter William Loose
and
Richard Arthur Sharman
BY Baldwin Wight & Brown ATTORNEYS INVENTORS
Peter William Loose
and
Richard Arthur Sharman
BY Baldwin Wight & Brown ATTORNEYS

COLOUR TELEVISION CAMERA EQUIPMENTS

This invention relates to colour television camera equipments and is concerned with so-called aperture correction in such equipments.

As is well known aperture correction is desirable in order to reduce distortion and loss of detail in a colour television camera due to the fact that the electron beam scanning "spots" in the camera tubes thereof are not mere points but are of finite area. Aperture distortion comprises two components, a horizontal component caused by the finite dimension of the spot in the horizontal direction (the line direction), and a vertical component, caused by the finite dimension of the spot in the vertical direction (the field direction). Correction of the horizontal component alone requires only simple circuitry to effect and is therefore commonly provided in present day colour television cameras. When properly carried out it improves the resolution of vertical lines and edges in the picture. Correction of the vertical component of aperture distortion is, however, so much more difficult that it is not provided at all in some colour television cameras, the cost and disadvantages of known means for correcting for the vertical component of aperture distortion being such that some camera manufacturers do not consider the overall advantage obtained sufficient to justify the cost.

However, correction means for the vertical component of aperture distortion are known and used and in order that the advantages of the present invention may be better understood, a known arrangement, shown in block diagram form in FIG. 1 of the accompanying drawings will first be described with the aid of the explanatory graph of FIG. 2 of the said drawings.

Figure 1:
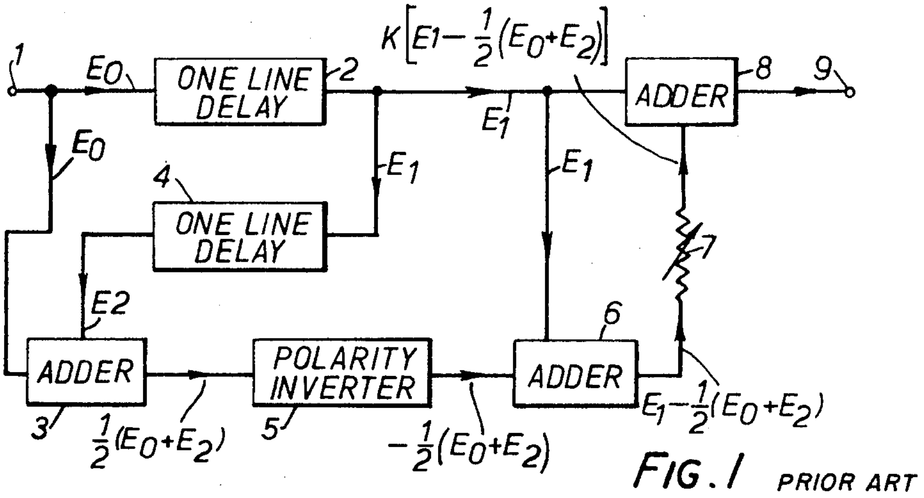
FIG. 1 PRIOR ART
Figure 2:
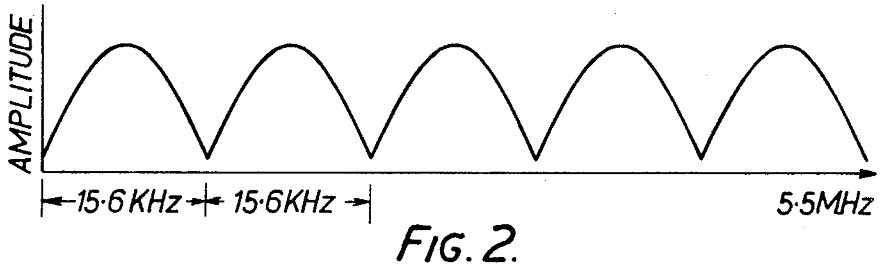

Referring to FIG. 1, a video signal Eo derived from the luminance tube (not shown) in the case of a four-tube camera with a luminance tube and three colour tubes or (preferably) from the green colour tube (not shown) of a camera having three colour tubes and no separate luminance tube, appears at terminal 1. This video signal is assumed, for simplification of explanation, to be a sine wave of period equal to one line scanning period (64 $\mu$ secs in a present day 625 line system, the line frequency being of course, approximately 15.6 KHz). The input Eo is fed through two delay circuits or devices 2 and 4 each providing a delay of one line period to an adding circuit 3 to the other input of which the signal at 1 is fed directly. The output from the first delay unit 2 is herein termed ($E_1$) and that from the second delay unit 4 is herein termed ($E_2$). The output ($\frac{1}{2}(E. + E_2)$), from the adder 3 is fed to a polarity inverter 5 to form a signal $-\frac{1}{2}(Eo + E_2)$. This is applied as one input to a further adder 6, the second input to which is the signal $E_1$. The output ($E_1 - \frac{1}{2}(Eo + E_2)$) from adder 6 is passed via an adjustable control 7, shown schematically as an adjustable resistance, as one input to another adder 8, the second input to which is the signal $E_1$, from unit 2. The input from control 7, which is the vertical aperture correction control fed to the adder 8 will be $k(E_1 - \frac{1}{2}(Eo + E_2))$ the value of K depending on the adjustment of the control 7. The signal at output terminal 9, which is a signal corrected for the vertical component of aperture distortion is taken off for utilisation.

As is well known this arrangement produces a "boosting" effect at and near odd multiples of half the line frequency, the amplitude/frequency characteristic of the arrangement exhibiting "nulls" occurring at integral multiples of the line scanning frequency and "peaks" at odd multiples of half the line frequency. This is shown conventionally in FIG. 2 which shows the effect over the whole video bandwidth, typically 5.5 MHz. As will be apparent from FIG. 2 the signals at odd multiples of the half line frequency are enhanced while signals at integral multiples of the line frequency are reduced or almost suppressed. Almost full suppression is shown in FIG. 2 this corresponding with adjustment of the control 7 to maximum correction.

The amount of useful vertical information, i.e. the contribution to good vertical definition contained in video signals of a frequency above a relatively low point in the whole video band — e.g. above a frequency of about 1.5 MHz in a total bandwidth of 5.5 MHz is negligibly small. The presence of noise particularly at and near odd multiples of the half-line frequency is, however, by no means unimportant even though above 1.5 MHz (in the example now being considered) but, on the contrary, can be very deleterious in effect. This is mainly because of its effects on the colour information. As well known, in an NTSC system the colour sub-carrier frequency is chosen at an odd multiple of the half line frequency in order that the colour sub-carrier shall not be visibly present in the picture. In some other systems the colour sub-carrier frequency is differently chosen to achieve the same result. Although therefore the vertical aperture correction arrangement of FIG. 1 will produce a perceptible improvement in picture definition in the vertical direction the "vertical combing" effect above described causes it to do so at the cost of an increase in noise spread over the band and occurring at and near odd multiples of the half line frequency and this is not only objectionable in itself but especially objectionable because noise components of frequencies in the region of the colour sub-carrier will cause serious interference patterns and "streaks" in the picture. The present invention seeks to avoid or reduce these serious defects.

According to this invention a colour television camera equipment wherein vertical aperture correction is effected by an arrangement which produces vertical combing and includes an adding circuit in which a vertically combed vertical aperture correcting video signal input is added to an uncorrected video signal input comprises means for eliminating from both said inputs frequencies above a frequency at least approximately equal to the highest video signal frequency useful for vertical definition; means for deriving from the uncorrected video signal input a horizontally combed video signal; and means for adding the same to the resultant of the aforesaid addition.

Preferably said horizontally combed video signal is limited, prior to adding the same to a predetermined upper range of video frequencies the lower limit of which is at least approximately equal to the aforesaid highest video signal frequency.

Preferably the horizontally combed video signal is derived by means including a further adder which adds video signals to the same signals delayed by one line period end to the same signals delayed by two line periods, said delays being provided by two delay devices, each providing a delay of one line period and which are also employed in the derivation of the vertically combed vertical aperture correcting video signal input.

The term "combed" is herein employed in its at present customary sense in the art to mean, in the case of a vertically combed signal, a signal whose amplitude/-frequency characteristic exhibits amplitude maxima at odd multiples of half the line frequency (i.e. where the vertical information is concentrated) and, in the case of a horizontally combed signal, a signal whose amplitude/frequency characteristic exhibits maxima at all integral multiples of the line frequency (i.e. where the horizontal information is concentrated).

In practice said highest video signal frequency is of the order of 100 times the line frequency.

According to a feature of this invention a colour television camera equipment comprises means for delaying video signal input derived from a selected camera tube in the equipment by two successive delays each of one line period; a first adder connected to add said output, undelayed, to said output delayed by two line periods; a second adder connected to add said output, undelayed, to said output delayed by one line period; a first low pass filter adapted to pass frequencies below that of aproximately the highest video frequency useful for vertical definition and fed with said output delayed by one line period; a second low pass filter having approximately the same pass range as the first and fed from the first adder; a high pass filter adapted to pass frequencies above approximately said highest video frequency and fed from the second adder; a third adder connected to add output from the first low pass filter to output from the second after polarity inversion of the same; means for adding the outputs from said first low pass filter, said third adder and the high pass filter, and means for adjusting the magnitude of the input to the last mentioned adding means from said third adder.

Preferably the first low pass filter and the high pass filter have complementary attenuation characteristics.

Preferably the uncorrected video signal input employed in carrying out this invention is the output from that one of the tubes in the camera which contributes most to the luminance signals. In the case of a four-tube camera with a separate luminance tube the output in question is that from said luminance tube. In the case of a three-tube camera with red, blue and green colour tubes the output in question is that of the green tube. It is, of course, possible to provide arrangements in accordance with this invention in the output circuits of all the tubes of a camera but, in general, this is not necessary.

The invention is illustrated in and further explained in connection with FIGS. 3 to 8 inclusive of the accompanying drawings. In these figures, FIG. 3 shows conventionally the nature of the distribution of energy in a typical video signal.

Figure 4:
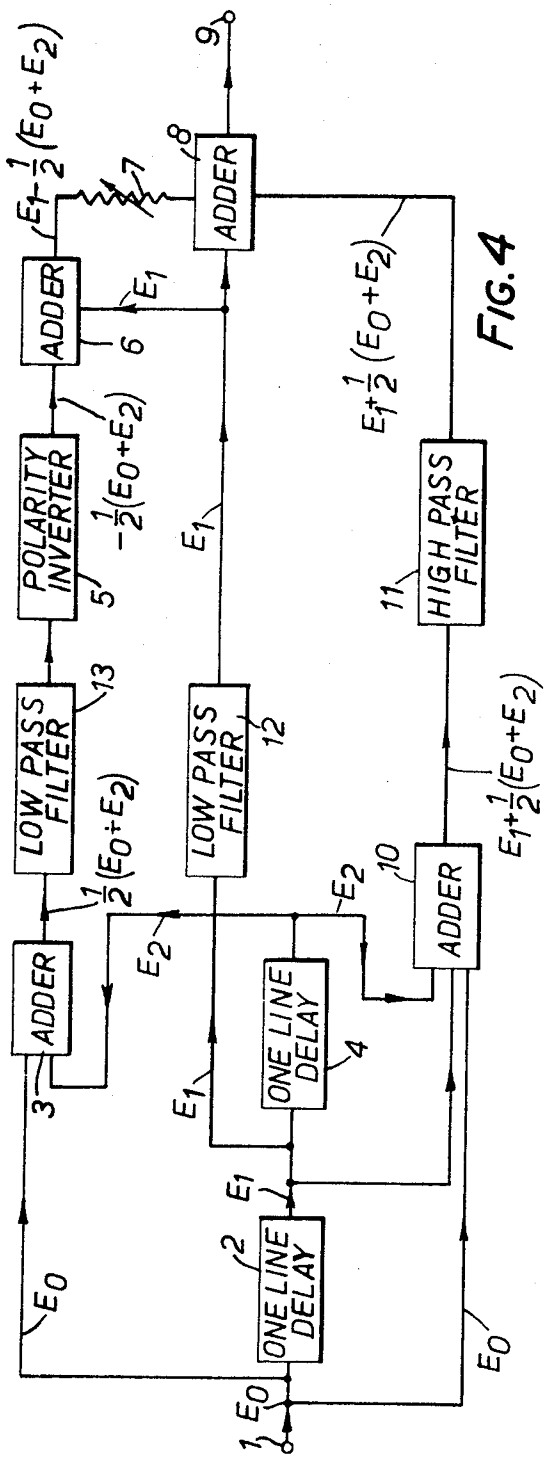
Figure 5:
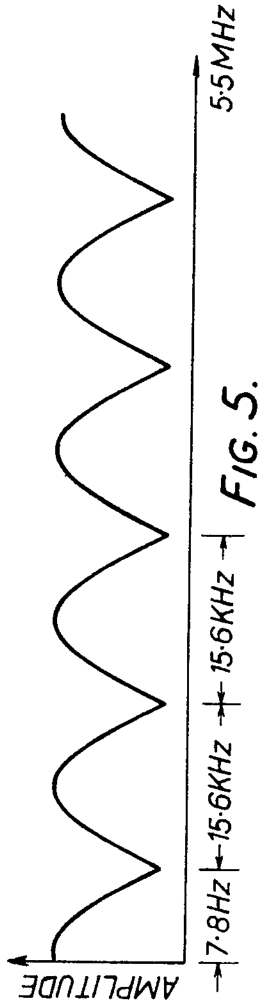

FIG. 4 is a block diagram of an embodiment of this invention and FIGS. 5 to 8 inclusive are explanatory graphical figures.

Figure 3:
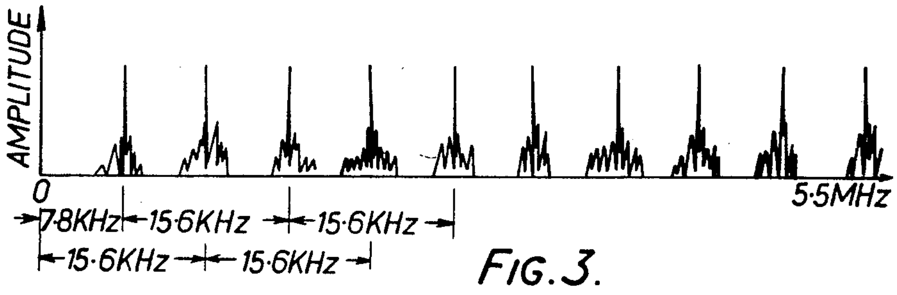

FIG. 3 shows the nature of the distribution of energy in the video output of the tube to whose output aperture correction is applied. As is well known, in a stationary picture, a large part of the energy is concentrated in "bunches" occurring at multiples of half the line scanning frequency. In a present day 625 line system the line frequency is approximately 15.6 KHz. Also, those video signal frequencies which provide vertical detail in the picture are situated at the odd multiples of the half line frequency whilst those video signal frequencies which provide horizontal detail in the picture are situated at all integral multiples of the line frequency. Typical frequency values for a 625 line system are indicated along the abscissa line in FIG. 3, the ordinates being amplitudes. The frequencies which contribute (other than negligibly) to vertical detail in the picture lie in the lower frequency part of the video band — typically in a 625 line system, below 1.5 MHz. The video bandwidth required for horizontal detail is much greater than that required for vertical detail — typically the former bandwidth may be anything from about two to four times the latter. As will be seen later advantage is taken of this, when carrying out the present invention, to separate the bands carrying the frequencies which contribute in the main to vertical and horizontal detail. As will again be seen later this separation is effected with the aid of delay units each giving a delay of one line period.

Let Eo denote the video signal output from the relevant camera tube, $E_1$ the same signal delayed by one line period, and $E_2$ the same signal delayed by two line periods. Then video signalS which will provide vertical aperture correction may be written as $E_1 - \frac{1}{2}(Eo + E_2)$ — see this expression in the description already given of FIG. 1 — and it may be shown that by adding video signals of the form $E_1 + \frac{1}{2}(Eo + E_2)$, a horizontally combed video signal may be derived.

Reference may now be made to FIG. 4 in which parts corresponding or nearly corresponding to parts in FIG. 1 are indicated by corresponding references. As will be seen the difference between FIGS. 1 and 4 are the addition of the two low pass filters 12 and 13, the addition of the high pass filter 11, the addition of a further adder 10, and the provision of a third input from the filter 11 to the adder 8. The low pass filters pass frequency below about 1.5 MHz and the filter 11 passes frequencies above about this value, assuming a 625 line system. The attenuation characteristics of the filters 11 and 12 are approximately complementary.

As already explained in connection with FIG. 1 the vertical aperture correction component $E_1 - \frac{1}{2}(Eo + E_2)$ appears at the output of adder 6 and is the same as in FIG. 1 except that the unwanted higher frequency signals and noise at frequencies above about 1.5 MHz and with most of their energies concentrated at odd multiples of the half line frequency are eliminated by the filter 13. The thus filtered, vertical aperture correction signal appearing at the output of adder 6 is indicated conventionally by the solid lines of FIG. 6.

The low pass filter 12 passes both horizontal and vertical component signals, delayed by one line period up to a frequency of about 1.5 MHz. The output from the filter 12 is conventionally represented in FIG. 7.

The camera tube video signal output Eo is applied to the adder 10 to which are also applied the delayed signals $E_1$ and $E_2$ delayed respectively by one line period and two line periods. The resultant of the addition, $E_1 + \frac{1}{2}(Eo + E_2)$ appears at the output of adder 10. This resultant exhibits peaks at all integral multiples of the line frequency and nulls at the odd multiples of the half line frequency. Thus the arrangement of FIG. 4 combs horizontal information in the video signal over the full width of the video band, assumed in the present example to be 5.5 MHz. Having regard to the colour subcarrier frequencies employed in present day standard colour television systems, e.g. 625 line or 525 line systems, it will be seen that, in both cases the combing of horizontal information as described is of major advantage, particularly as respects reducing noise which would otherwise adversely affect the colour subcarrier.

Figures 6, 7, 8:
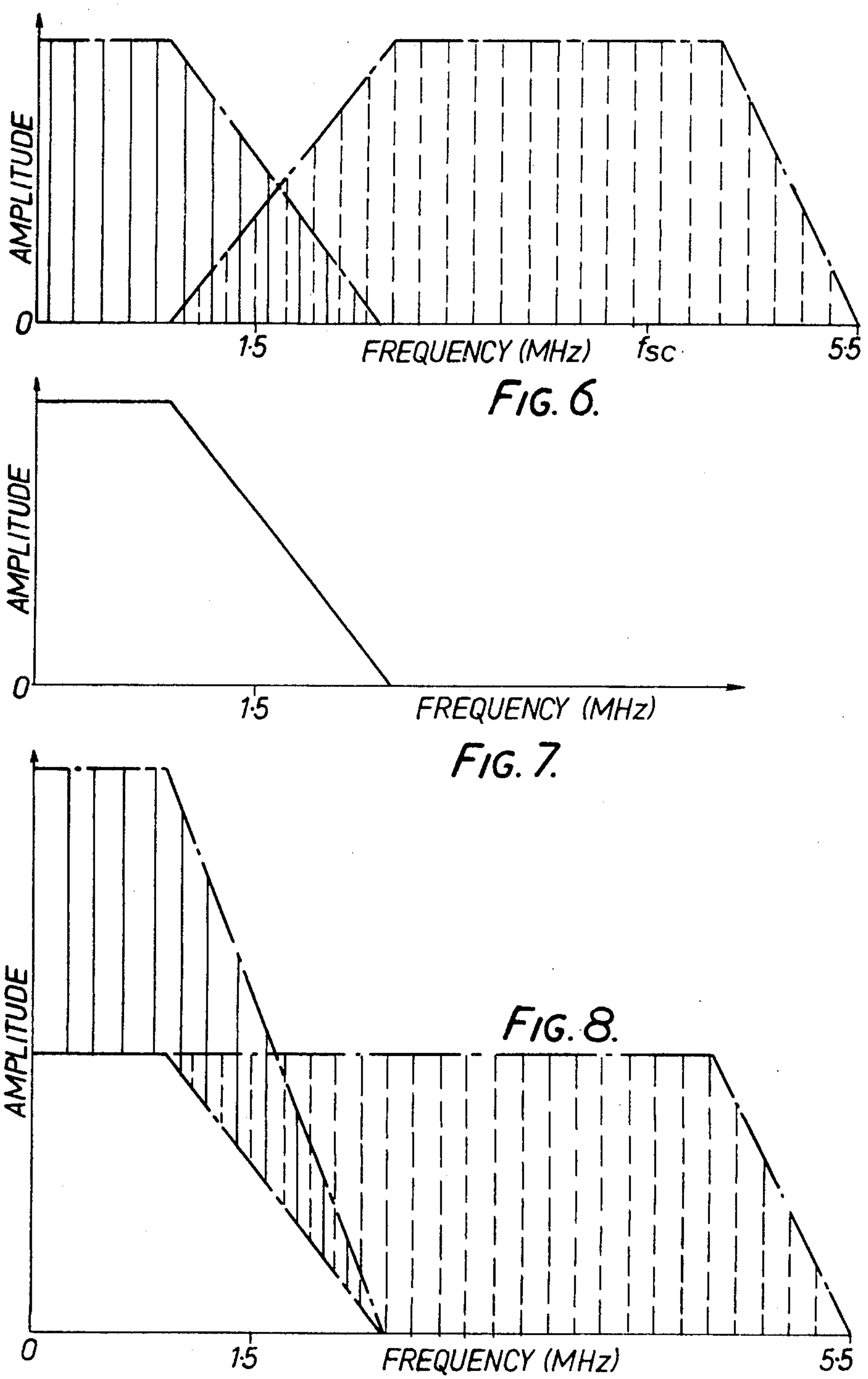

The signal from adder 10 containing the horizontal component of information is passed through the high pass filter 11, the output of which is represented by the broken lines in FIG. 6. This signal is added as the third input to adder 8.

Control (by the control 7) to obtain good picture sharpness as regards vertical detail can be exercised without any substantial increase in noise. The final overall resulting amplitude/frequency characteristic of the video signals, corrected for vertical aperture distortion is as represented conventionally in FIG. 8.

In a practical experimental embodiment of the invention a substantial improvement in signal/noise ratio was obtained.

In describing the invention hereinbefore no description has been given and no apparatus has been illustrated for providing correction for the horizontal component of aperture distortion i.e. horizontal aperture correction has been ignored. Ordinarily of course, horizontal aperture correction will be provided in a practical camera but means for achieving this have not been described because the present invention is not concerned with this and it may be done in any suitable manner well known per se. Thus, for example, horizontal aperture correction could be effected in the embodiment illustrated in FIG. 4 by branching off output from the output of the adder 10 and feeding it through a shaping circuit having suitable amplitude/phase amplitude/frequency characteristics to an additional third input provided in the adder 6 or to an additional (fourth) input provided in the adder 8. Because horizontal combing has been achieved prior to the adder 6 (and also, of course, prior to the adder 8, the horizontal aperture correction obtained in this way, will also be improved in that the effects of noise in the neighbourhood of the colour sub carrier frequency will be reduced.

We claim:

1. A colour television camera circuit for improving picture quality comprising, a camera tube operative to produce an output video signal, first comb filter means arranged to produce from said output video signal a combed output signal having an amplitude-frequency characteristic with amplitude maxima at odd multiples of half the line frequency and adding means for adding the output from said first comb filter means to an uncombed video signal derived from said output video signal, to correct for loss of definition due to the finite vertical dimension of the scanning spot in the camera tube, first bandpass filter means for removing from each of the signals, added in said adding means, frequencies which do not contribute to vertical definition, the circuit further comprising second comb filter means for producing from an uncombed video signal, a combed output signal, with an amplitude-frequency characteristic exhibiting amplitude maxima at integral multiples of the line frequency, second bandpass filter means for removing from the output of said second comb filter means frequencies which would adversely affect the enhancing of vertical definition achieved by said first comb filter means and means for adding the output from said second bandpass filter means to the signals added in said adding means.

2. A circuit as claimed in claim 1 in which said second bandpass filter means has a frequency bandwidth the lower limit of which is approximately equal to the upper limit of the frequency bandwidth of said first bandpass filter means.

3. A circuit as claimed in claim 1 in which said second comb filter means comprises first delay means for delaying said output video signal by one scanning line period, second delay means for delaying the output of said first delay means by a further scanning line period and adding means for adding said output video signal to the output of said first delay means and the output of said second delay means, said first and second delay means being common to said first comb filter.

4. A colour television circuit comprising means for delaying video signal input derived from a selected camera tube in the equipment by two successive delays each of one line period; a first adder connected to add said input, undelayed, to said input delayed by two line periods; a second adder connected to add said input, undelayed, to said input delayed by one line period; a first low pass filter adapted to pass frequencies below that of approximately the highest video frequency useful for vertical definition and fed with said input delayed by one line period; a second low pass filter having approximately the same pass range as the first and fed from the first adder; a high pass filter adapted to pass frequencies above approximately said highest video frequency and fed from the second adder; a third adder connected to add output from the first low pass filter to output from the second after polarity inversion of the same; means for adding the outputs from said first low pass filter, said third adder, and the high pass filter, and means for adjusting the magnitude of the input to the last mentioned adding means from said third adder.

5. A colour television circuit as claimed in claim 4 and wherein the first low pass filter and the high pass filter have complementrary attenuation characteristics.

6. A color television circuit as claimed in claim 4 and wherein the uncorrected video signal input employed in carrying out this invention is the output from that one of the tubes in the camera which contributes most to the luminance signals.

7. A color television circuit as claimed in claim 6 and comprising a four-tube camera with a separate luminance tube and wherein said last mentioned output is that from said luminance tube.

8. A color television circuit as claimed in claim 6 and comprising a three-tube camera with red, blue and green colour tubes and wherein said last mentioned output is that from said green colour tube.

9. In a colour television camera system having a video signal output of selected bandwidth, a circuit for correcting for the vertical component of aperture distortion, said circuit comprising in combination:

first comb filter means connected to said video output signal for producing a vertically combed output signal having amplitude/frequency characteristic with amplitude maxima at odd multiples of half the line frequency, said first comb filter means including filter means for removing frequencies in the higher frequency range of said bandwidth;

second comb filter means connected to said video output signal for producing a horizontally combed output signal having amplitude/frequency characteristic with maxima at integral multiples of the line frequency, said second comb filter means including filter means for removing frequencies in the lower frequency region of said bandwidth; and adder means having the outputs of said first and said second comb filter means as inputs thereto.

10. In a colour television camera system as defined in claim 9 wherein a further filter means for removing frequencies in the higher region of sand bandwidth is provided, said further filter means having said video signal output delayed by one line period as an input thereto and having an output connected to said adder means.

11. In a colour television camera system having a video signal output Eo of selected bandwidth, a circuit for correcting for the vertical component of aperture distinction, said circuit comprising in combination:

first comb filter means for producing a vertically combed output signal of the form $E_1 - \frac{1}{2}(Eo + E_2)$ in which $E_1$ is said signal Eo delayed by one line period and $E_2$ is said signal Eo delayed by two line periods, said first comb filter means including a first filter means for removing from the vertically combed output signal frequencies in the higher region of said bandwidth;

second comb filter means for producing a horizontally combed output signal of the form $E_1 + \frac{1}{2}(Eo + E_2)$ and including second filter means for removing from the horizontally combed output signal frequencies in the lower region of said bandwidth; and adder means having said vertically combed and said horizontally combed output signals as two inputs thereto and having a signal corresponding to said once delayed signal $E_1$ as a third input for producing a corrected video output signal corrected for said vertical component of aperture distinction.

* * * * *